Jan. 2, 1951
E. G. LEWIS
2,536,559
SYSTEM FOR MAINTAINING THE
ALIGNMENT OF PULLEY BELTS
Filed July 24, 1948
3 Sheets-Sheet 1
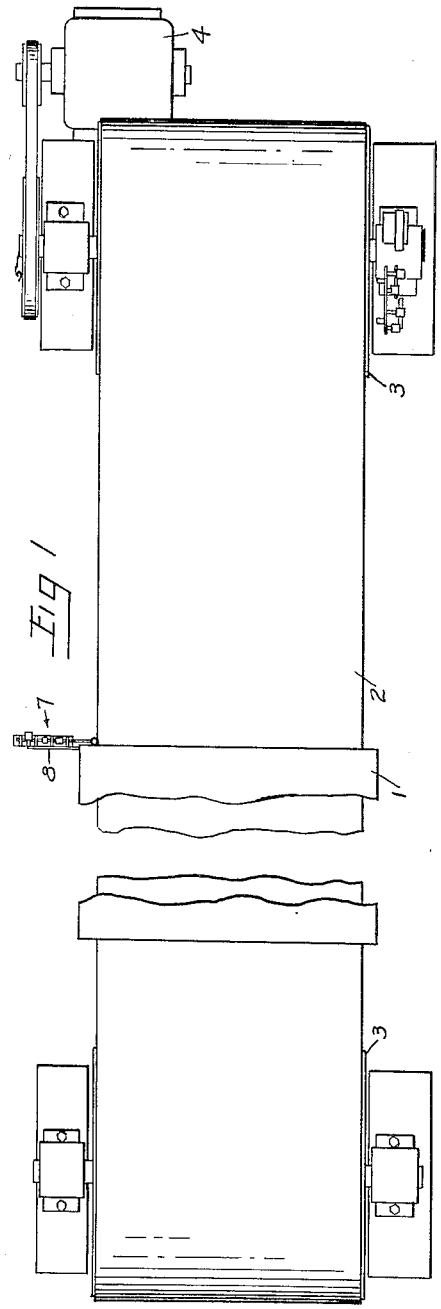
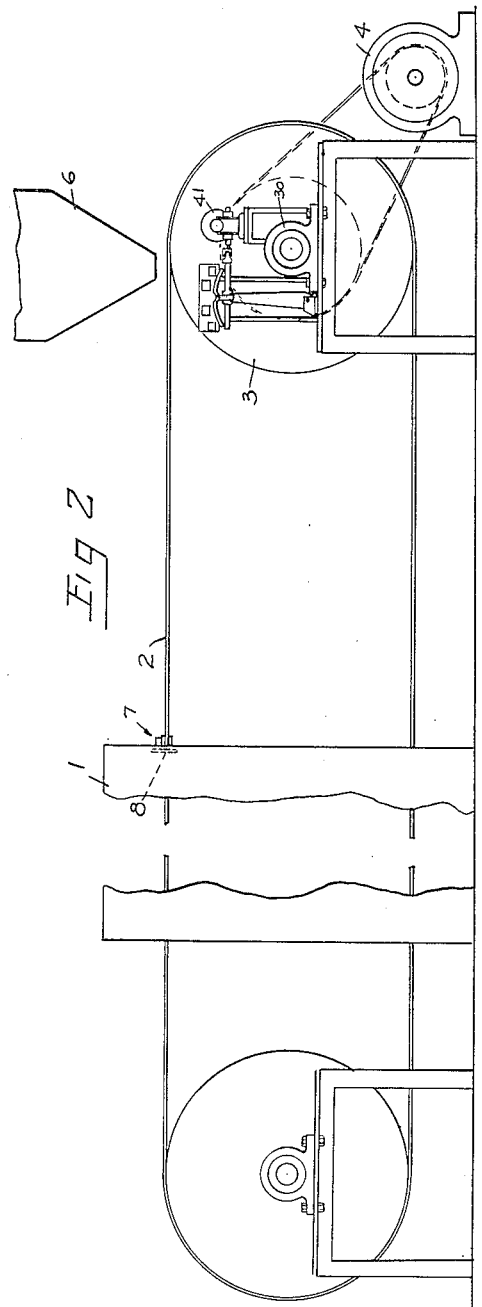
INVENTOR.
EARL G. LEWIS
BY
Boyken, Mohler & Beckley
ATTORNEYS.

Jan. 2, 1951
E. G. LEWIS
2,536,559
SYSTEM FOR MAINTAINING THE
ALIGNMENT OF PULLEY BELTS
Filed July 24, 1948
3 Sheets—Sheet 2
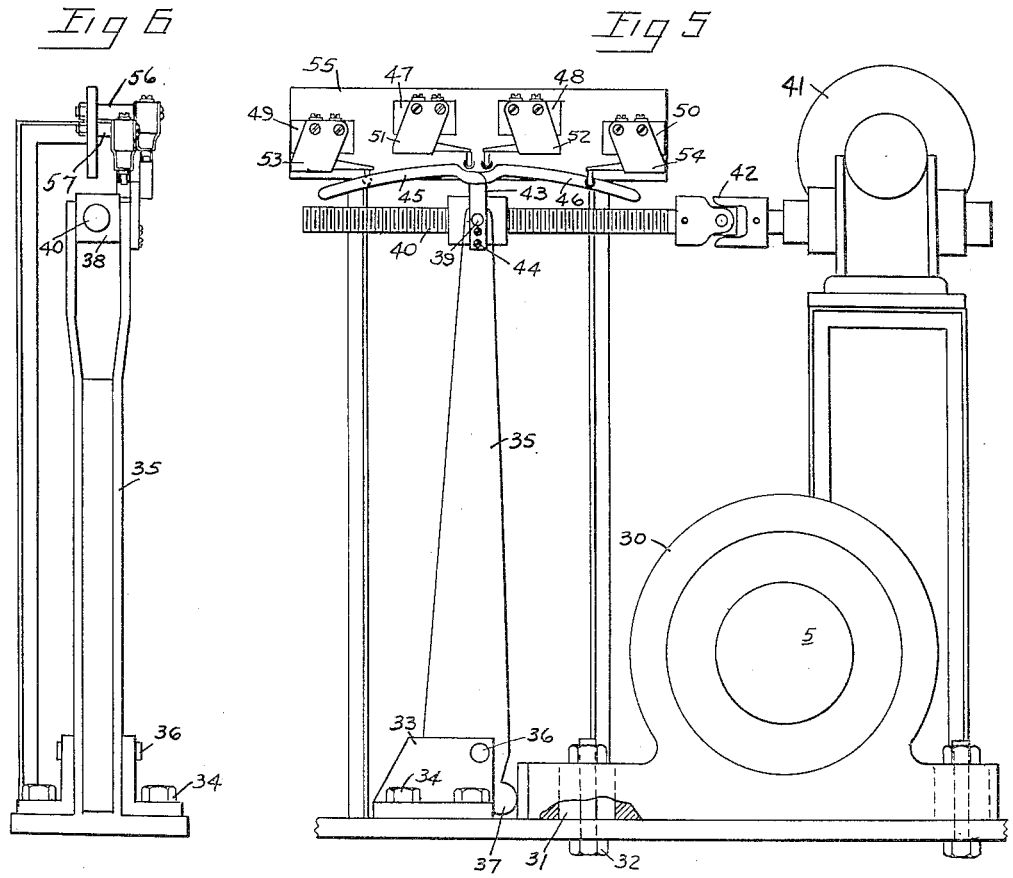
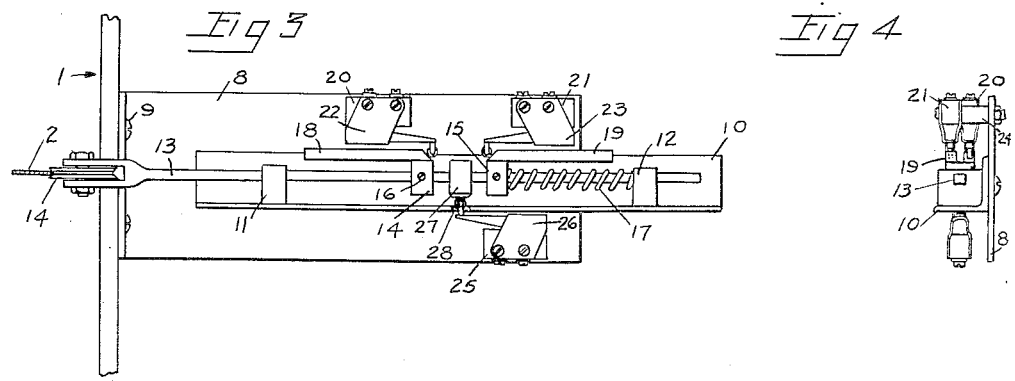
INVENTOR.
EARL G. LEWIS
BY
Boyken, Mohler & Beckley
ATTORNEYS

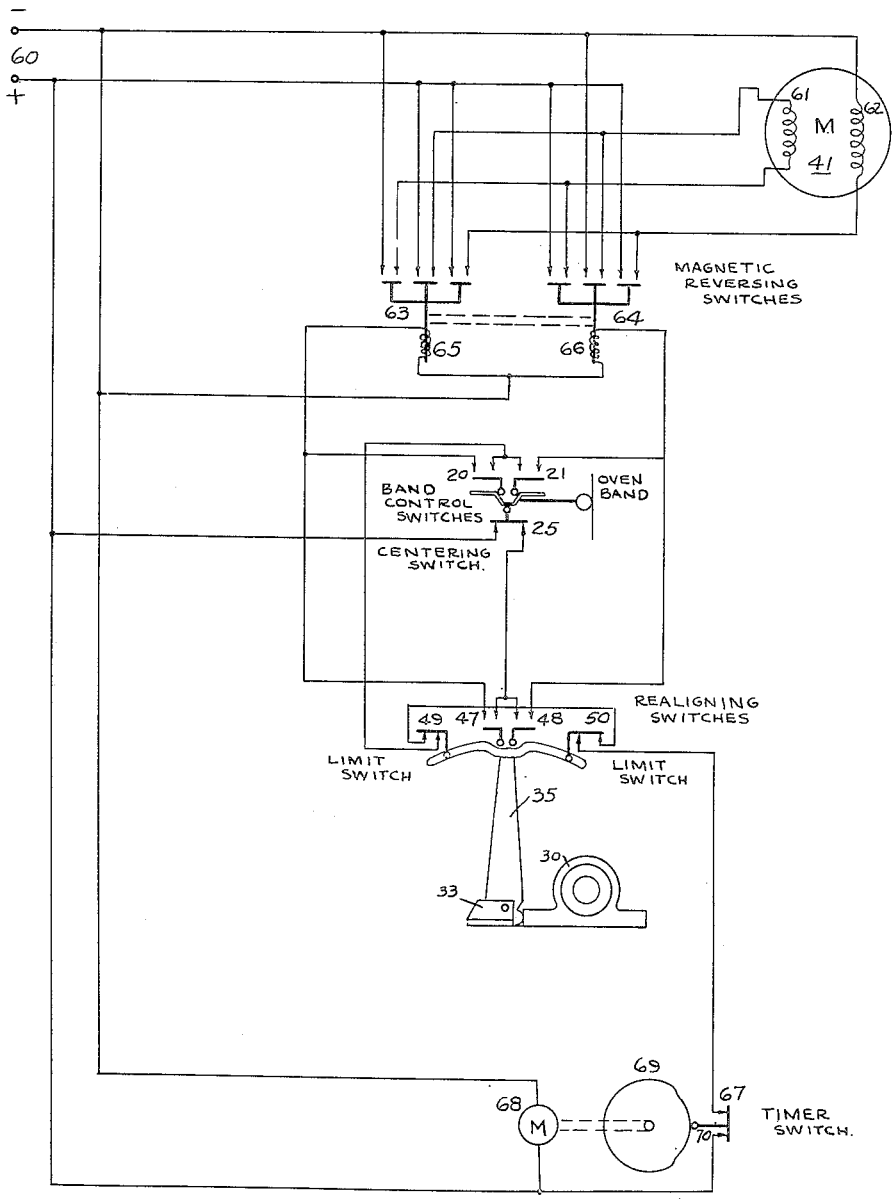

Patented Jan. 2, 1951

2,536,559

UNITED STATES PATENT OFFICE 2,536,559

SYSTEM FOR MAINTAINING THE ALIGNMENT OF PULLEY BELTS

Earl G. Lewis, Oakland, Calif., assignor to Langendorf United Bakeries, Inc., San Francisco, Calif., a corporation of Delaware Application July 24, 1948, Serial No. 40,545

14 Claims. (Cl. 74—241)

1

This invention relates to a system for realigning pulley belts, bands and the like and more particularly to a system for automatically maintaining such alignment.

In any mechanical system in which bands, belts, conveyors etc. (herein referred to as bands or belts) mounted on pulleys, drums, wheels (herein generally referred to as pulleys or drums) for transmitting power or conveying material, the problem of maintaining proper alignment of the belt with the pulley exists. Where such belts are very long and the loading is irregular, they tend to move laterally on the pulleys and the alignment necessary for proper operation is destroyed.

A common method of solving this problem has been to mount one or both of the pulleys on a floating block so that the pulley axis could be shifted in order to apply more or less tension to one side of the belt and thus cause it to shift back to the central aligned position.

In many instances, however, this method requires the constant attendance of one or more operators to manually shift the pulley axis. This is particularly true in oven installations where the pulley band comprises an endless steel conveyor for carrying material through a heated oven. In such mechanisms an irregularity in loading the band causes the band to be heated or cooled non-uniformly in the lateral direction and consequent non-uniform expansion or contraction. The result is that tension on one edge of the band is greater or less than at the opposite edge and the band will move laterally due to this difference in tension. Shifting of the axis of one or both of the pulleys to balance or override this tension will thus cause realignment of the band. But, in ovens of this character, this operation is an almost continuous one requiring the almost constant skill and attention of an operator.

The present invention is a system which measures the amount of lateral shift in the band and automatically shifts the pulley axis to restore the required alignment.

One of the objects of the invention is thus a system for automatically maintaining the lateral alignment of a pulley belt.

Another of the objects of the invention is a system for measuring the lateral misalignment of a pulley belt and for shifting the pulley axis for restoring alignment.

A further object of the invention is a system for maintaining the lateral alignment of a pulley belt where the causes of such alignment are intermittently and irregularly applied.

Still another object of the invention is a system for shifting the axis of a pulley to maintain the alignment of the band and automatic means for returning the axis to its normal position when the realignment or its causes cease to exist.

In general, the invention comprises a system which is part mechanical and part electrical. It features a mechanical follower actuated by lateral shift in the pulley belt and which is provided with cams for operating switches in an electrical control circuit. These switches control the application of power to a reversible electric motor connected to shift the axis of the pulley in the proper direction to restore such misalignment. There is also provided a realigning circuit for restoring the position of the pulley axis automatically when the misalignment has been corrected.

Although, there are several mechanisms which might accomplish this purpose in accordance with the invention, the one specifically illustrated herein was designed for and has been successfully used in connection with a baking oven, the conveyor band of which is formed from thin steel, very susceptible to expansion and contraction. It is to be clearly understood, however, that the form specifically described is illustrative only and applications other than this preferred form will be obvious to those skilled in the art.

In the drawings,

Fig. 1 is a general plan view of a baking oven showing the preferred form of the invention applied thereto.

Fig. 2 is an elevation of the structure shown in Fig. 1.

Fig. 3 is a detailed front elevation of the mechanical portion of the control and follower mechanism.

Fig. 4 is a detailed end elevation of the structure shown in Fig. 3.

Fig. 5 is a detailed front elevation of the mechanical portion of the realigning mechanism.

Fig. 6 is a detailed end elevation of the structure shown in Fig. 5.

Fig. 7 is an electrical schematic view of the circuits used in conjunction with the invention.

A general view of the oven structure with which the preferred form of the invention is designed to be used is shown in Figs. 1 and 2. The oven is generally designated 1 and is of a conventional type having an endless conveyor band 2 mounted on drums or pulleys 3, one of which is located at each end of the oven. The band is usually of thin Swedish steel, some .04" to .05" thick and approximately 3 feet wide. It is arranged to be driven by a motor 4 connected to the pulley shaft 5 at varying rates of speed.

A hopper 6 containing the dough or ingredients is mounted above one of the pulleys and these are dropped onto the band in desirable and conventional sizes. For example, cookie dough may be dropped periodically onto the band in a series of parallel rows. However, any lateral irregularity in the load carried by the band causes it to be heated in an irregular fashion and the resulting uneven expansion or contraction of the band causes it to move laterally on the pulleys.

In the form of the invention to be described, the realigning mechanism will be shown only as applied to one pulley, but it will be obvious that an identical unit could be applied to the pulley at the other end of the oven to perform identical functions.

The lateral motion of the band 2 is measured by a follower mechanism illustrated in Figs. 3 and 4. The mechanism, generally designated 7, is mounted on a base plate 8 secured to the wall of the oven 1 by bolts 9. Secured to the plate 8 is support 10 which may conveniently be formed from a length of angle iron. A pair of bearings 11, 12 are secured to the support 10, each of which is slotted horizontally to receive and support a square follower rod 13. Rod 13 is forked at the end adjacent the oven band to support a horizontally disposed follower wheel 14, which is formed with a V-shaped circumferential groove adapted to receive the edge of the band 2, as can be seen in Fig. 3.

A pair of spaced blocks 14, 15 are secured centrally of and to the follower rod 13 but their positions are made adjustable by loosening set screws 16. To hold the follower wheel 14 against the oven band, there is provided a compression spring 17, surrounding the follower rod and positioned between block 15 and support 12. This construction will cause the follower wheel to maintain contact with the band at all times regardless of its lateral position.

Blocks 14, 15 each support one of a pair of bar cams 18, 19 respectively, formed from square key stock. Each cam is welded to a respective one of the blocks and extends horizontally and laterally from the center of the follower mechanism as shown in Fig. 3. The cams are also displaced from one another in a direction along the band, as can be seen in Fig. 4, for a purpose to be described, and their adjacent ends are angularly terminated as can be seen in Fig. 3.

A pair of band control switches 20, 21 are also mounted on the base plate 8 above and over the cams. These may be of conventional type microswitches (provided with actuators 22, 23, respectively, having arms and rollers operated by the cams 18, 19) and are spaced, as can be seen in Fig. 3, so that when the cams are centrally positioned each of the actuating rollers lies between the cams. In order to position the switches over the respective cams, switch 21 is supported outwardly of switch 20 on a spacer 24, as can be seen in Fig. 4, so that it only contacts cam 19. Both switches are arranged to rest in the normally open position and it is only when lateral off center movement of the oven band 2 causes corresponding motion of the follower rod that one or the other of the band control switches 20, 21 is closed by reason of the operation of the associated cam and actuator arm. It is thus seen that so long as the band 2 and follower rod 13 are centrally positioned, switches 20, 21 are both open; but that lateral motion will close one of the switches. It is also seen that the spacing between the cams 18, 19 may be adjusted by shifting of the supporting blocks 14, 15 to predetermine the amount of lateral motion permitted to the band before one of the band control switches is operated.

In addition to the band control switches just described, there is also provided a centering switch 25. This also may be a conventional microswitch mounted with its associated actuator 26 on plate 8. It is conveniently placed underneath the follower rod 13 and is actuated by a block cam 27 secured to the rod 13 at its center. To permit this construction, support 10 may conveniently be cut away as at 28 to permit the actuator arm 26 to extend upwardly therethrough for contact with cam 27. Centering switch 25 is also of the normally open type, but is closed in the position shown in Fig. 3. Lateral motion of the band, follower rod and cam 27 in either direction will cause it to open.

The other major mechanical portion of the invention is the realignment mechanism shown in detail in Figs. 5 and 6.

The drum or pulley 3 is mounted on a pair of pillow blocks 30, one of which is adapted to slide longitudinally of the band by the provision of guide slots, as at 31, and bolts 32, as can be seen in Fig. 5. On the side of the pillow block nearest the oven is a block 33 secured to its support by bolts 34. This block is adapted to support an upstanding lever arm 35 by means of a pin or pivot 36. The lever arm is provided with a rounded extension 37 at its lower end positioned in frictional contact with pillow block 30, in such a way that rocking of the lever arm will cause sliding of the pillow block and a shifting of the axis of the drum or pulley. It is noted that lever arm 35 is located at one end of the pulley and its operation, together with the tension in the band, will cause the axis of the pulley to shift and thus increase or decrease the tension in the band on one edge with respect to the tension on the other edge. It is found that only a slight amount of such shifting is required to cause the band to gradually move laterally on the drum or pulley. For this reason and because the band tension may be very great, the lever arm operating against the pillow block 30 is many times shorter than the upstanding lever arm. It should also be noted that the drum or pulley is preferably mounted on self-aligning bearings in order that the pillow block at the opposite end of the drum may be permanently secured to its support.

The upper end of the lever arm 35 is forked as shown in Fig. 6 and carries an internally threaded nut 38, pivotally supported on pin 39. Nut 38 is adapted to receive a lead screw 40 which is connected to a stationary reversible motor 41 by means of a conventional universal joint 42. Lever arm 35 also carries extension 43 secured to it by bolts 44 which is adapted to position a pair of off-set cams 45, 46. These cams are slightly curved, as can be seen in Fig. 5, on a radius operating from pin 36 as a center point and extend oppositely from the center of the lever arm.

Associated with the cams are two pairs of conventional microswitches 47, 48, 49, 50 and their associated actuators 51, 52, 53, 54, all secured to a stationary mounting plate 55. Switches 47, 50 are actuated by cam 45; switches 48, 49 are actuated by cam 46. Switches 47, 50 are positioned outwardly of plate 55 on spacers 56. Switches 48, 49 are positioned outwardly of plate 55 on spacers 57. The two central switches 47, 48 are realigning switches and their actuator rollers are positioned and adapted to roll along the respective cams. The central end of each cam is lowered slightly so that when the lever arm 35 is in its central position the rollers on realigning switches 47, 48 just clear their associated cams, as can be seen in Fig. 5, and the switches are open. Rotation of the arm in either direction carries one of the switch actuators up onto the higher portion of the cam and closes the associated switch.

The remaining two switches 49, 50 are limit switches and are positioned outwardly of the centering switches. Their actuator rollers also contact the cams 46, 45. In normal operation these switches are both closed and open only when the lever arm has been rotated through an angle sufficient to cause the roller to contact the higher portion of its respective cam.

The operation of this realigning mechanism is relatively simple in that rotation of the lead screw 40 by operation of motor 41 causes lever arm 35 to be rotated on pin 36. Extension 37 on the arm moves one bearing of the drum and shifts its axis in a direction determined by the direction of operation of the lead screw. So long as the lever arm is in the central position cams 45, 46 hold the realigning switches 47, 48 open and the limit switches 49, 50 remain closed. Rotation to the right (in Fig. 5), first causes centering switch 47 to close and excessive rotation in that direction ultimately causes limit switch 50 to be opened by cam 45. Reverse rotation first causes centering switch 48 to close and ultimately causes limit switch 49 to be opened by cam 46.

Fig. 7 shows the electrical circuit associated with the invention. Terminals 60 supply power to the reversible single phase motor 41 which is indicated as having two windings 61, 62, one of which may be reversed across terminals 60 by means of a conventional magnetic reversing contactor. This contactor comprises twelve contacts and a pair of three-unit switches 63, 64 manually associated so that only one may be closed at any one time. When switch 63 is closed current flows in each winding in the motor 61 and causing it to revolve in a certain direction when switch 64 is closed, the motor is started in the opposite direction due to the reversing of the starting current in winding 62 by switch 64.

Switches 63, 64 are magnetically operated by a pair of solenoids 65, 66 connected in a control circuit in such a way that current flowing in solenoid 65 closes switch 63 and current flowing in solenoid 66 closes switch 64. The solenoids 65, 66 are connected in individual series circuits with the off-center control switches 20, 21, respectively, and assuming the limit switches 49, 50 and timer switch 67 to be described, are closed, connect the solenoids across terminals 60. Thus, if switch 20 closes, solenoid 65 closes switch 63 to operate motor 41 in one direction, and if switch 21 closes, solenoid 66 closes switch 64 to operate motor 41 in the opposite direction.

The above description of the control circuit permits the explanation of the main function of the invention. Lateral movement of the oven band toward the right (in Fig. 3) causes cam 18 to close control switch 20. This applies a current to the solenoid 65 to operate magnetic switch 63 and consequent rotation of motor 41 in one direction. Such rotation threads the lead screw 40 through nut 38, moving lever 35, which in turn moves the pulley pillow block 30 and causes the axis of the pulley to be shifted. The direction of shift in the axis is, of course, chosen so as to oppose the lateral movement of the band thus preventing further shifting and causing the band to move again toward its central and aligned point. It is further obvious that movement of the band to the left (in Fig. 3) will cause a similar but reverse operation through switch 21, solenoid 66 and switch 64.

In the control circuit illustrated in Fig. 7, a timer switch 67 has also been shown and although its use is not necessary to operation, its use is preferable. It is of a conventional type comprising a small synchronous motor 68 arranged to drive a substantially circular cam 69. The switch itself is attached to a cam follower 70 and the cam is shaped to maintain the switch closed during only a portion of the time required for a single revolution of the cam. It has been found that a motor revolving the cam at one R. P. M. and which maintains the switch closed during 10–15 seconds of the minute is quite satisfactory. Thus, the operation described above, in which the axis of the pulley is shifted to realign the band, takes place intermittently rather than continuously.

Preferably cam 69 is of the conventionally adjustable type in which the duration of the two time intervals (open and closed) may be adjusted at will. This provides means for determining with any given installation approximately the length of time the normal realignment adjustment takes. It also provides an opportunity for self alignment of the belt should the cause of the misalignment cease to exist during the open interval. In oven operation, this is particularly important, as self alignment may well occur quite quickly if the cause of misalignment ceases to exist. The open interval thus prevents the alignment mechanism from over compensating through continuous operation over a relatively long period and also prevents so-called "hunting" of the band back and forth past its aligned position.

It is also obvious that the operation described will continue until the band returns to its central position. When this happens, the position of cams 18, 19 causes both control switches 20, 21 to open and the operation of motor 41 ceases.

One further safeguard should also be noted. One of the limit switches 49, 50 is included in series in each of the control circuits to prevent said circuits from shifting the axis of the pulley to an undesirable extent. Thus, should lever 35 be shifted to a point where cam 45 or 46 operates the associated limit switch actuator, the limit switch will open and prevent further shifting. This prevents possible damage or injury to the pulley should it be shifted too far.

When motor 41 finally stops the realigning procedure the axis of the pulley 3 may well be left in an angular position which, if allowed to persist, would cause the band to move to the opposite side of the pulley. To prevent this, means are provided to automatically realign the axis of the pulley, after each shifting of the pulley's axis and as soon as the band has returned to center.

The realigning circuit for performing this function comprises the centering switch 25 (which is operated by the follower arm 13 on the band control mechanism) and the two realigning switches 47, 48 (which are operated by movement of the lever arm 35). Each of the realigning switches 47, 48 is connected in series with a respective one of the solenoids 65, 66 parallel with one of the control circuits. These two circuits are both connected in series with the centering switch 25 so that the magnetic reversing switches 63, 64 and motor 41 may also be operated by this arrangement. Thus, for example, if the lever arm 35 is lift in an off-center position after the band has been realigned, one of the realigning switches 47, 48 is necessarily closed by virtue of the position of one of the cams 45, 46 and since the band is in its central position, cam block 27 will also have closed centering switch 25. This will complete the circuit to operate the motor 41 through the corresponding reversing switch.

In this connection, it should be noted that operation of motor 41 by virtue of one of the aligning circuits, containing either realigning switch 47 or 48, must be arranged to be in the opposite direction from that caused by its operation through the circuit containing the centering switch 20 or 21 which caused the original shift to occur. Thus, if realignment of the band has been accomplished by one of the control circuits to cause rotation of the motor and shifting of lever 35 in one direction, the realigning circuit established by closure of either realigning switch 47, 48 must cause rotation of the motor and shifting of the lever in the opposite direction to properly recenter the lever. And, of course, when the lever 35 is realigned, cams 45, 46 cause both realigning switches 47, 48 to open and further operation ceases.

From the above description, it is seen that a simple and effective automatic means has been illustrated for maintaining alignment of the pulley and band of an automatic oven. The same principle could, of course, be applied to other and similar structures where such realignment is necessary. In addition to the mechanism for realigning the band, particularly efficient operation is obtained because of the provision of the automatic means for realigning the axis of the pulley after it has been shifted to realign the band. This feature is particularly important in operations where the cause of the misalignment is not constant but an irregular and intermittent one. For example, in the baking oven installation, the size or positioning of the dough units being baked may vary considerably from edge to edge of the band during small intervals of time. Such variations, however, are easily corrected by the present invention and the automatic operation proves both efficient and simple.

I claim:

1. A system for maintaining the alignment of a belt running on a pulley comprising: an electric circuit including an electric motor and a switch connected in series; follower means, supported for movement for closing said switch, actuated for such movement by lateral movement of said belt to a position out of alignment on said pulley; means driven by said motor upon said switch being closed for shifting the axis of rotation of said pulley in a direction to restore said alignment; a timing switch in said circuit connected in series with said switch and said motor for causing intermittent operation of said motor when said switch is closed.

2. A system for maintaining the alignment of a belt running on a pulley comprising: an electric circuit including an electric motor and a switch connected in series; follower means, supported for movement for closing said switch, actuated for such movement by lateral movement of said belt to a position out of alignment on said pulley; means driven by said motor upon said switch being closed for shifting the axis of rotation of said pulley in a direction to restore said alignment; means for restoring said axis of rotation of said pulley to its normal position after said alignment of said belt on said pulley has been restored.

3. A system for maintaining the alignment of a belt running on a pulley comprising: an electric circuit including a motor and a reversing switch connected in series; follower means, supported for movement for closing said reversing switch actuated for such movement by lateral movement of said belt out of alignment on said pulley, said reversing switch being closed in one direction by movement of said follower means in one direction and being closed in the reverse direction by movement of said follower means in the opposite direction; means driven by said motor upon said reversing switch being closed for shifting the axis of rotation of said pulley in a direction to restore said alignment; a timing switch in said circuit connected in series with said switch and said motor for causing intermittent operation of said motor when said switch is closed.

4. A system for maintaining the alignment of a belt running on a pulley comprising: an electric circuit including a motor and a reversing switch connected in series; follower means, supported for movement for closing said reversing switch actuated for such movement by lateral movement of said belt out of alignment on said pulley, said reversing switch being closed in one direction by movement of said follower means in one direction and being closed in the reverse direction by movement of said follower means in the opposite direction; means driven by said motor upon said reversing switch being closed for shifting the axis of rotation of said pulley in a direction to restore said alignment; means for restoring said axis of rotation of said pulley to its normal position after said alignment of said belt on said pulley has been restored.

5. A system for maintaining the alignment of a belt on a pulley comprising: an electric circuit including a reversible motor and a reversing switch connected in series; said reversing switch having one open and two closed positions for determining the direction of rotation of said motor; a control circuit including two parallel branches, each having a control switch and a means for closing said reversing switch in a respective one of its closed positions upon the closing of the associated control switch and the consequent flow of current therein; follower means, supported for movement for closing said control switches, actuated for such movement by lateral movement of said belt to a position out of alignment on said pulley, whereby one of said control switches is closed by movement in one direction and the other of said switches is closed by movement in the opposite direction; means driven by said motor for shifting the axis of rotation of said pulley in a direction to restore said alignment when either of said control switches is closed, a pair of centering switches each of which is connected in parallel with a respective one of said control switches; second follower means, supported for movement for individually closing said centering switches, actuated for movement by said pulley when its axis of rotation is shifted; means driven by said motor to restore the axis of said pulley to its normal position after said alignment of said belt on said pulley is restored.

6. A system for maintaining the alignment of a belt on a pulley comprising: an electric circuit including a reversible motor and a reversing switch connected in series; said reversing switch having one open and two closed positions for determining the direction of rotation of said motor; a control circuit including two parallel branches, each having a control switch and a means for closing said reversing switch in a respective one of its closed positions upon the closing of the associated control switch and the consequent flow of current therein; follower means, supported for movement for closing said control switches, actuated for such movement by lateral movement of said belt to a position out of alignment on said pulley, whereby one of said control switches is closed by movement in one direction and the other of said switches is closed by movement in one direction and the other of said switches is closed by movement in the opposite direction; means driven by said motor for shifting the axis of rotation of said pulley in a direction to restore said alignment when either of said control switches is closed, a timing switch in said control circuit connected in series with said control switches and said motor for causing intermittent operation of said motor when one of said control switches is closed.

7. A system for maintaining the alignment of a belt on a pulley comprising: an electric circuit including a reversible motor and a reversing switch connected in series; said reversing switch having one open and two closed positions for determining the direction of rotation of said motor; a control circuit including two parallel branches, each having a control switch and a means for closing said reversing switch in a respective one of its closed positions upon the closing of the associated control switch and the consequent flow of current therein; follower means, supported for movement for closing said control switches, actuated for such movement by lateral movement of said belt to a position out of alignment on said pulley, whereby one of said control switches is closed by movement in the opposite direction; means driven by said motor for shifting the axis of rotation of said pulley in a direction to restore said alignment when either of said control switches is closed, a timing switch in said control circuit connected in series with said control switches and said motor; means for intermittently opening and closing said timing switch; means for adjusting the relative length of the intervals during which said timing switch is open and closed.

8. A system for maintaining the alignment of a belt on a pulley comprising: an electric circuit including a reversible motor and a reversing switch connected in series, said reversing switch having an open and two closed positions for determining the direction of rotation of said motor; a pair of magnetic coils associated with said reversing switch and each of which is arranged and adapted to move said reversing switch into a respective one of its closed positions; a control circuit including two parallel branches, each having a control switch and one of said coils connected in series therein for causing operation of said reversing switch upon the closing of one of said control switches and the consequent flow of current in said branch; follower means, supported for movement near said belt, and actuated means, supported for movement near said belt, and actuated by lateral movement of said belt out of alignment with said pulley; a cam secured to said follower means for closing one of said control switches upon motion of said follower in one direction and for closing the other of said control switches upon motion of said follower in the opposite direction; a lever in engagement with said pulley for shifting its axis of rotation; means driven by said motor for operating said lever; means for causing intermittent operation of said motor.

9. A system for maintaining the alignment of a belt running on a pulley comprising: an electric circuit including an electric motor and a switch connected in series; follower means, supported for movement for closing said switch, actuated for such movement by lateral movement of said belt to a position out of alignment on said pulley; means driven by said motor upon said switch being closed for shifting the axis of rotation of said pulley in a direction to restore said alignment; automatic means for restoring said axis of rotation of said pulley to its normal position after said alignment of said belt on said pulley has been restored.

10. A system for maintaining the alignment of a belt running on a pulley comprising: an electric circuit including an electric motor and a switch connected in series; follower means supported for movement for closing said switch, actuated for such movement by lateral movement of said belt to a position out of alignment on said pulley; means driven by said motor upon said switch being closed for shifting the axis of rotation of said pulley in a direction to restore said alignment; a second switch connected in series with said motor; second follower means supported for movement for operating said second switch, actuated for such movement by shifting of the axis of rotation of said pulley to a position out of alignment; means driven by said motor upon said second switch being operated for shifting said axis in a direction to restore its alignment.

11. A system for maintaining the alignment of a belt running on a pulley comprising: an electric circuit including an electric motor and a switch connected in series; follower means supported for movement for closing said switch, actuated for such movement by lateral movement of said belt to a position out of alignment on said pulley; means driven by said motor upon said switch being closed for shifting the axis of rotation of said pulley in a direction to restore said alignment; a second switch connected in series with said motor; second follower means supported for movement for operating said second switch, actuated for such movement by shifting of the axis of rotation of said pulley to a position out of alignment and after the alignment of said belt has been restored; means driven by said motor upon said second switch being operated for shifting said axis in a direction to restore its alignment.

12. A system for maintaining the alignment of a belt running on a pulley comprising: an electric circuit including an electric motor and a switch connected in series; follower means, supported for movement for closing said switch, actuated for such movement by lateral movement of said belt to a position out of alignment on said pulley; means driven by said motor upon said switch being closed for shifting the axis of rotation of said pulley in a direction to restore said alignment; means for causing intermittent operation of said motor when said switch is closed.

13. A system for maintaining the alignment of a belt running on a pulley comprising: an electric circuit including an electric motor and a switch connected in series; follower means, supported for movement for closing said switch, actuated for such movement by lateral movement of said belt to a position out of alignment on said pulley; means driven by said motor upon said switch being closed for shifting the axis of rotation of said pulley in a direction to restore said alignment; means for causing intermittent operation of said motor when said switch is closed; means for restoring said axis of rotation of said pulley to its normal position after said alignment of said belt on said pulley has been restored.

14. A system for maintaining the alignment of a belt running on a pulley comprising: an electric circuit including a motor and a reversing switch connected in series; follower means, supported for movement for closing said reversing switch actuated for such movement by lateral movement of said belt out of alignment on said pulley, said reversing switch being closed in one direction by movement of said follower means in one direction and being closed in a reverse direction by movement of said follower means in the opposite direction; means driven by said motor upon said reversing switch being closed for shifting the axis of rotation of said pulley in a direction to restore said alignment; means for causing intermittent operation of said motor when said switch is closed.

EARL G. LEWIS.

REFERENCES CITED

The following references are of record in the file of this patent:

UNITED STATES PATENTS

| Number | Name | Date |
|---|---|---|
| 1,186,906 | Hopkins | June 13, 1916 |
| 2,210,925 | Hill | Aug. 13, 1940 |